United States Patent [19]
Lammers et al.

[11] Patent Number: 5,282,566
[45] Date of Patent: Feb. 1, 1994

[54] LIFT ARM ASSEMBLY PROCESS

[75] Inventors: Bryan G. Lammers, Washington, Ill.; Gilles Didier, Grenoble, France

[73] Assignee: Caterillar Inc., Peoria, Ill.

[21] Appl. No.: 990,138

[22] Filed: Dec. 14, 1992

[51] Int. Cl.$^5$ ............... B23K 31/00; B23K 101/24; E02F 3/80
[52] U.S. Cl. .................... 228/161; 228/175; 228/182; 228/213; 228/222; 29/467; 414/722
[58] Field of Search ............... 228/175, 182, 161, 213, 228/222; 29/467, 464, 891; 269/47, 50, 51; 414/722

[56] References Cited

U.S. PATENT DOCUMENTS

| D. 251,845 | 5/1979 | Joupperi et al. | D15/24 |
| 3,867,750 | 2/1975 | Den Bleyker | 29/891 |
| 4,156,488 | 5/1979 | Stark | 414/697 |
| 4,161,369 | 7/1979 | Moreno | 414/722 |
| 4,162,872 | 7/1979 | Gross et al. | 414/713 |

Primary Examiner—Paula A. Bradley
Assistant Examiner—Jeanne M. Elpel
Attorney, Agent, or Firm—Claude F. White

[57] ABSTRACT

A process for the manufacture of a lift arm assembly for a work vehicle includes a plurality of closely controlled process steps. The lift arm assembly is a large fabrication which, when assembled to the vehicle, interconnects with several other components and work implements. In order to properly connect with these other components, the various holes, throughbores, and connecting surfaces must be machined within close tolerances. The subject process provides the controls for holding the tolerances within specified and acceptable ranges. The lift arm assembly produced by the subject process is used for lifting and manipulating a bucket or other type of work implement.

9 Claims, 4 Drawing Sheets

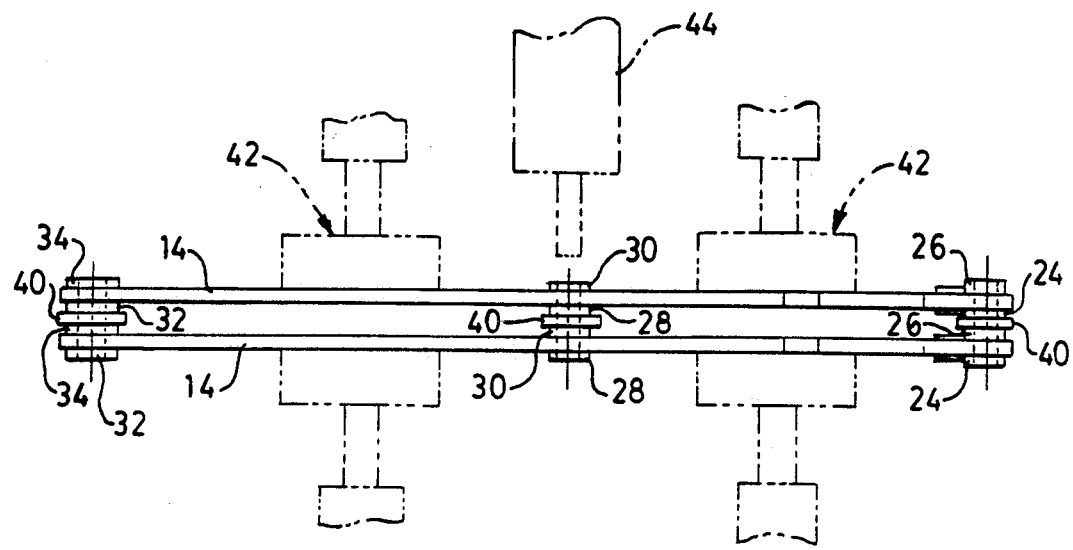
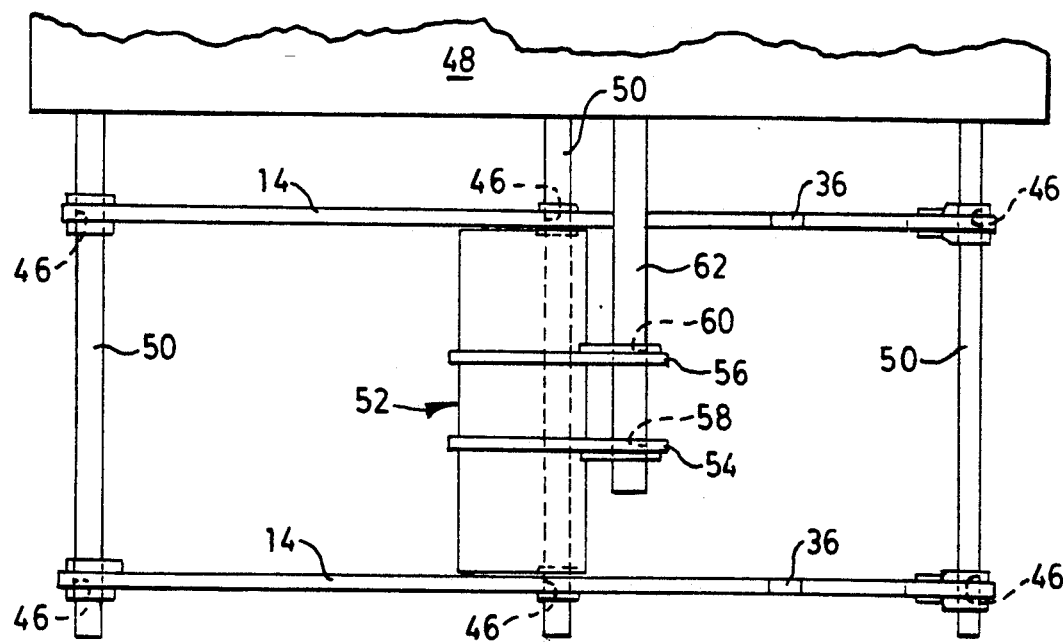

LIFT ARM ASSEMBLY PROCESS

DESCRIPTION

1. Technical Field

This invention relates generally to a process of manufacturing a lift arm assembly for a vehicle and more particularly to the various process steps and to the finished lift arm assembly.

2. Background Art

Prior art lift arm assemblies for construction and earthmoving vehicles are generally fabricated into the assemblies and then machined to provide the various connecting bores and stop surfaces. Because the assemblies are rather large and bulky, the machine tools for finish machining and boring of the assemblies are large, complex, and expensive. Smaller, less complex, and less expensive machine tools can be used to machine portions of the assembly before they are fabricated into the finished product. Additionally, the geometric relationships, or functional requirements, of the finished assembly are more easily maintained by the elimination of machining on the large fabrications and performing less machining on smaller components before they are fabricated into the larger final assembly. The present invention includes a plurality of specific process steps to control and maintain tolerances.

The present invention is directed to overcoming one or more of the problems as set forth above.

DISCLOSURE OF THE INVENTION

In one aspect of the present invention, a process for the manufacture of a lift arm assembly for a work vehicle includes a plurality of process steps, including cutting a plurality of arm plates from a metal slab, welding a plurality of boss plates to preselected surfaces areas of each arm plate, clamping at least two of the arm plates together and positioning the clamped plates in a first holding fixture, and boring a plurality of holes through the arm plates and the boss plates. The process further includes separating the bored arm plates a preselected distance and positioning them in a second holding fixture with pins of the fixture passing through aligned holes in each of the arm plates. Additionally, the process includes positioning a crosstube assembly between the spaced arm plates, welding the crosstube assembly to the arm plates, and removing the lift arm assembly from the holding fixture.

Present manufacturing procedures for producing large fabricated lift arm assemblies generally include fabricating the assembly and subsequently performing the machining operations on the fabricated assembly. This requires very large and complex machine tool and fixtures for manipulating the bulky lift arm assemblies.

The subject process utilizes a series of steps for finish machining sub-assemblies of the larger assembly before fabrication and controlling the tolerances during the final fabrication operation.

BRIEF DESCRIPTION OF THE DRAWINGS

FIG. 4 is a diagrammatic top plan view of a pair of lift arm plates clamped together and with a machining tool in position for boring holes through the arm plates and bosses;

FIG. 5 is a diagrammatic top plan view of a lift arm assembly, including a crosstube assembly, held in a manipulating fixture;

BEST MODE FOR CARRYING OUT THE INVENTION

Figure 1:
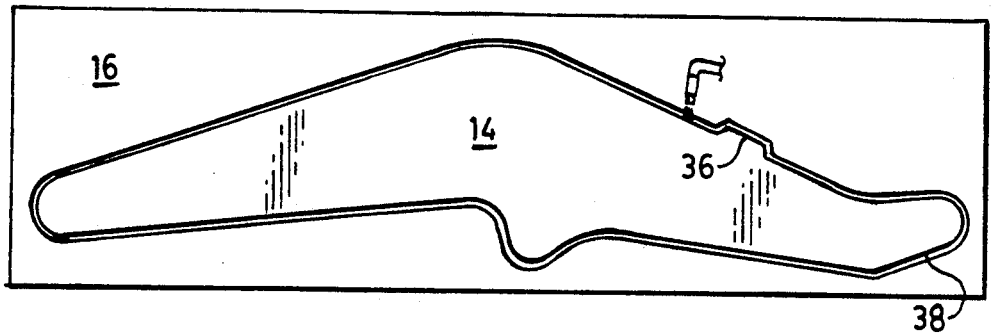
FIG. 1 is a diagrammatic plan view of a lift arm plate being flame cut from a steel slab.
Figure 2:
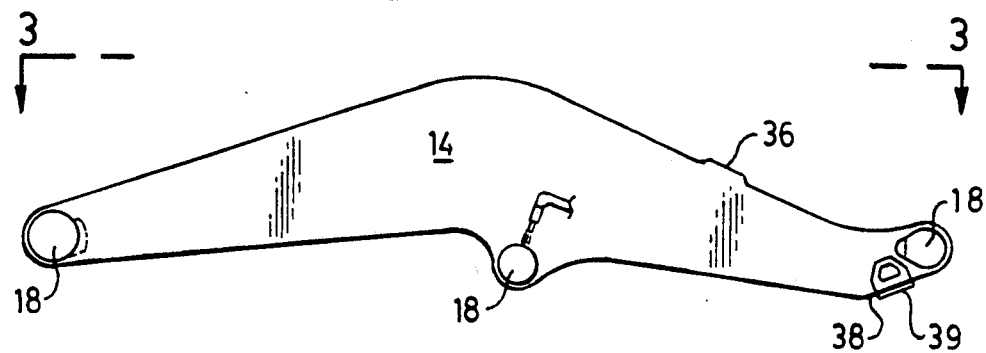
FIG. 2 is a diagrammatic side elevational view of a lift arm plate with a plurality of boss plates welded to the arm plate at specific locations.
Figure 3:
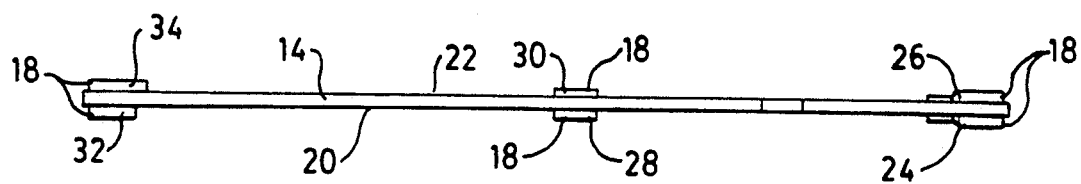
FIG. 3 is a diagrammatic top plan view of the lift arm plate of FIG. 2, taken generally along the lines 3—3 of FIG. 2.
Figure 6:
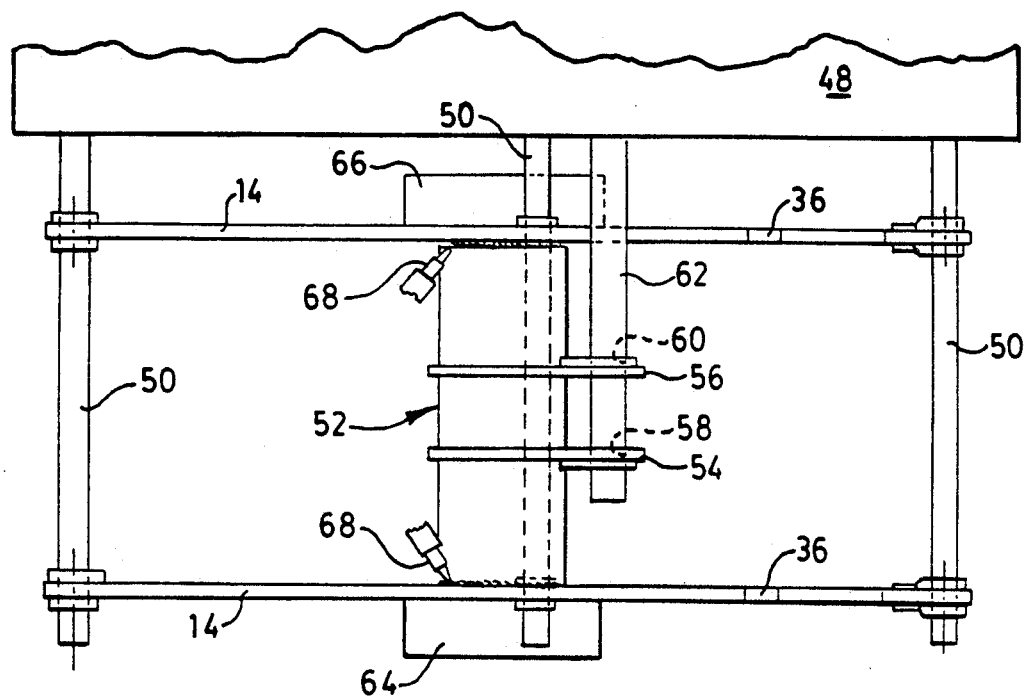
FIG. 6 is a diagrammatic top plan view similar to FIG. 5 with welding machines in place to weld the crosstube assembly to the lift arm plates.
Figure 7:
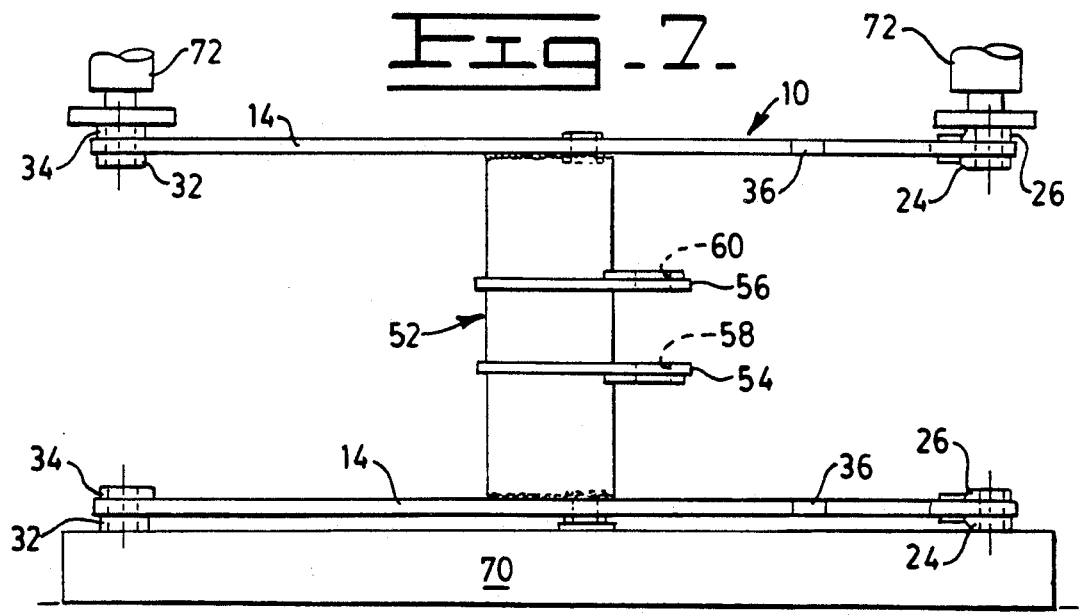
FIG. 7 is a diagrammatic side elevational view of a completed lift arm assembly of the present invention with presses in place to straighten the arm plates.
Figure 8:
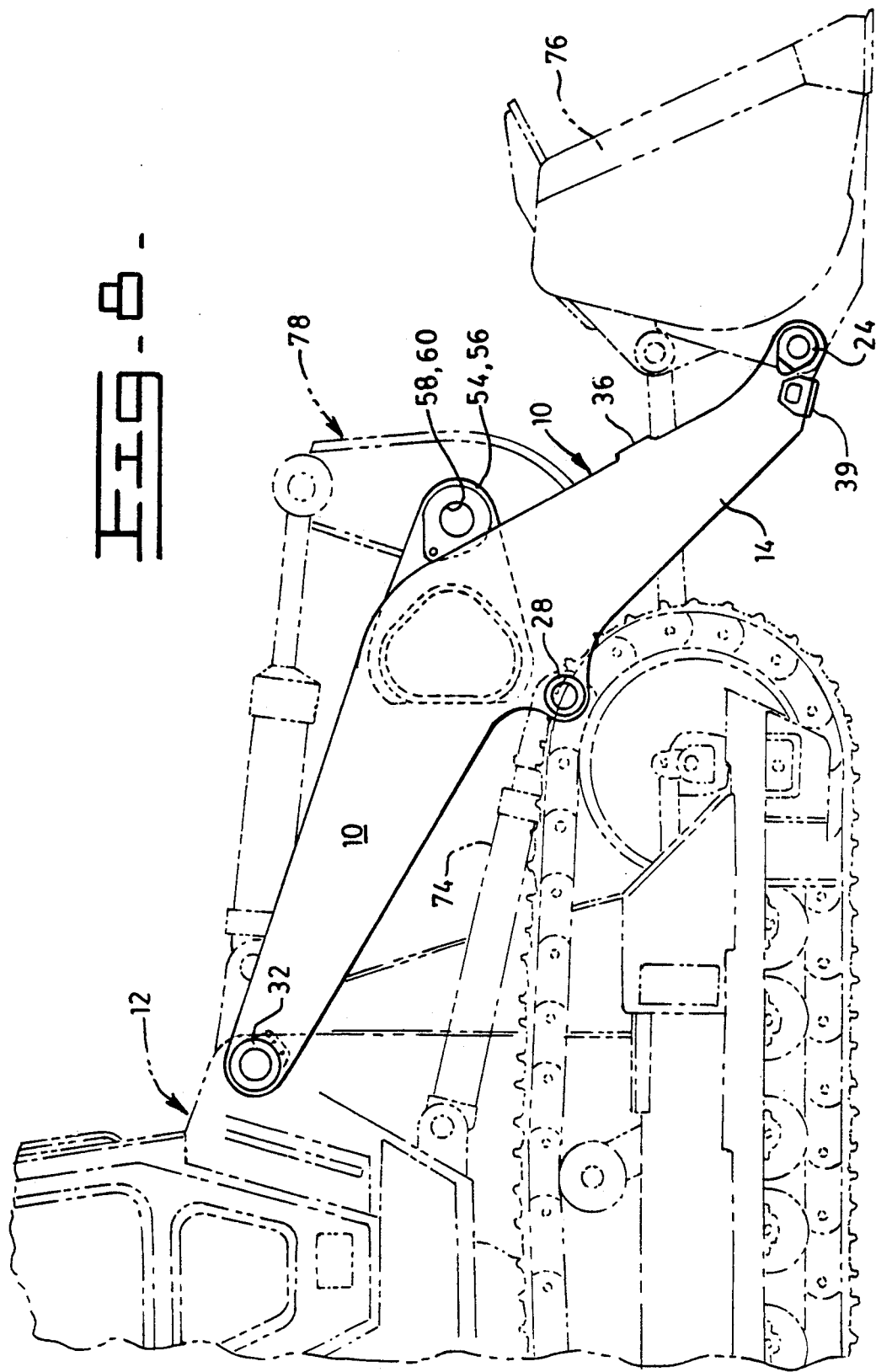
FIG. 8 is a diagrammatic side elevational view of a portion of a track-type vehicle with the subject lift arm assembly attached to the vehicle.

With reference to the drawings, a process for the manufacture of a lift arm assembly 10 for a work vehicle 12 includes cutting a plurality of contoured arm plates 14 from a metal slab 16, and welding a plurality of boss plates 18, to preselected areas of first and second surfaces 20,22 of each arm plates 14. The boss plates 18 include first and second bucket connecting plates 24,26 joined to respective first and second surfaces 20,22, first and second fluid cylinder connecting plates 28,30, joined to respective first and second surfaces 20,22, and first and second vehicle connecting plates 32,34, joined to respective first and second surfaces 20,22. First and second stop profiles 36,38 are provided on the lift arm plates 14 during the cutting operation. Replaceable stop plates 39 are joined to the arm plates at the area of each first stop profile 36.

After the boss plates 18 are joined to the arm plates 14, the arm plates 14 are clamped together in pairs, or multiple pairs, with a plurality of spacers 40 positioned between the arm plates 14 at preselected locations. Preferably, the spacers 40 are positioned in the areas of the boss plates 18. The clamped arm plates 14 are positioned in a first holding fixture 42 with the first and second stop profiles 36,38 being used to precisely align the arm plates 14. The stop profiles 36,38 are used for positioning because there is a functional relationship between the stop profiles 36,38 and the bores through the bucket connecting plates 24,26. Once aligned, a machine tool 44 is used to bore a plurality of aligned holes 46 through the arm plates 14 and the boss plates 18, one hole 46 at each boss plate 18 location. After the holes 46 are bored, the arm plates 14 are separated and spaced apart a preselected distance, and are then positioned in a second holding fixture 48. The second holding fixture 48 has a plurality of fixture pins 50 with one of the pins 50 being adapted to pass through aligned holes 46 in each pair of spaced arm plates 14. The first and second stop profiles 36,38 on each arm plate 14 are preferably used to engage mating portions of the second holding fixture for aligning the arm plates 14 during a subsequent welding operation.

A crossmember assembly 52 is provided and positioned between the spaced arm plates 14. The crossmember assembly 52 has first and second spaced flange portions 54,56, each having respective first and second axially aligned throughbores 58,60. The second fixture 48 has a locating rod 62 which is adapted to pass through the first and second throughbores 58,60 for holding and aligning the crossmember assembly 52 with respect to the arm plates 14. With the crossmember assembly 52 supported by the rod 62, it can be rotated to a predetermined position between the arm plates 14 where it is tack welded to the arm plates 14 to hold it in place prior to final welding to the arm plates 14.

Once the crossmember assembly is secured to the arm plates 14 by the tack welds, first and second heat absorbing masses 64,66 are clamped to the outside surfaces of each arm plate 14 at a location substantially opposite the crossmember assembly 52. The heat absorbing masses 64,66 will help prevent severe distortion of the arm plates 14 during the welding operation. One or more welding torches 68 are then utilized to weld the crossmember assembly 52 to the arm plates 14. Preferably, the arm plates 14 are rotated during the welding operation, and a plurality of weld passes are used. Following the completed welding operation, the lift arm assembly 10 is removed from the second holding fixture 48 and supported on a platform or table 70. One or more presses or fluid cylinders 72 then apply a force to the lift arm assembly 10 to straighten the arm plates 14 and make them substantially parallel one to the other. The lift arm assembly 10 is now completed and can be assembled to a vehicle 12. The lift arm assembly 10 is adapted to be connected to the vehicle 12 through the first and second vehicle connecting plates 32 and 34. The lift arm assembly 10 is adapted to be connected to a pair of fluid operated lift cylinders 74 through the first and second cylinder connecting plates 28,30. A bucket 76, or other type of work implement, is adapted to be connected to the lift arm assembly 10 through the first and second bucket connecting plates 24,26. A bucket tilt linkage assembly 78 is adapted to be connected to the lift arm assembly 10 through the first and second throughbores 58,60 of the first and second flanges 54,56.

INDUSTRIAL APPLICABILITY

With reference to the drawings, the subject process is particularly useful for producing a lift arm assembly 10, and the lift arm assembly 10 produced by the subject process is particularly useful with earthmoving vehicles such as wheel and track-type bucket loading machines. The lift arm assembly 10 is the major machine component for lifting and manipulating a bucket 76 or other work implement. Because the lift arm assembly 10 is a large fabricated assembly, and because several other components interconnect with the lift arm assembly 10, holding close tolerances of the multiple holes 46 and throughbores 58,60 is very important. It is also important to hold the sub-assemblies in close alignment during the fabrication process, and to control distortion during joining of the components by welding. The subject process provides the necessary controls to hold the tolerances within acceptable ranges and produces a finished lift arm assembly 10 which is consistently within manufacturing specifications.

Other aspects, objects, and advantages of this invention can be obtained from a study of the drawings, the disclosure, and the appended claims.

We claim:

1. A process for the manufacture of a lift arm assembly for a work vehicle, comprising the following operations:
    cutting a plurality of contoured arm plates from a metal plate;
    welding a plurality of boss plates to preselected surface areas of each arm plate;
    clamping pairs of arm plates together with a plurality of spacers positioned between said arm plates at preselected locations;
    positioning said clamped arm plates in a first holding fixture;
    boring a plurality of aligned holes through the clamped arm plates and boss plates at each boss plate location;
    separating and spacing the bored arm plates a preselected distance and positioning the arm plates in a second holding fixture in contoured alignment, said second holding fixture having a plurality of fixture pins, one of said pins passing through aligned holes in each pair of arm plates;
    providing a crossmember assembly and positioning said crossmember assembly between said spaced arm plates;
    clamping a heat absorbing mass to the outside surface of each arm plate at a location substantially opposite said crossmember assembly;
    welding said crossmember assembly to said arm plates; and
    removing said lift arm assembly from said holding fixture.

2. A process, as set forth in claim 1, including the operation of tack welding said crossmember assembly to said arm plates prior to the welding of said crossmember assembly to said arm plates.

3. A process, as set forth in claim 1, wherein said welding of said crossmember to said arm plates includes a plurality of weld passes.

4. A process, as set forth in claim 1, including the operation of rotating said arm plates during said welding.

5. A process, as set forth in claim 1, wherein said flame cutting operation includes defining first and second stop profiles on cut surfaces of said arm plates.

6. A process as set forth in claim 5, including the operation of welding stop plates to the arm plates at the area of said first stop profile.

7. A process, as set forth in claim 1, including applying a force to the arm plates subsequent to said welding operation, said force acting to straighten said arm plates and make said arm plates substantially parallel one to the other.

8. A process, as set forth in claim 1, wherein said crossmember assembly includes first and second spaced flange portions having respective first and second axially aligned throughbores, said second fixture having a locating rod being adapted to pass through said first and second throughbores for holding and aligning said crossmember assembly with respect to said arm plates.

9. A process, as set forth in claim 5, wherein said first and second stop profiles are adapted to engage mating portions of said second holding fixture during said welding operation.

* * * * *